(12) United States Patent
Heraud et al.

(10) Patent No.: US 7,898,470 B2
(45) Date of Patent: Mar. 1, 2011

(54) METHOD AND SYSTEM FOR MONITORING THE POSITIONS OF MULTIPLE TOWED VEHICLES USING A SINGLE HIGH ACCURACY RECEIVER

(75) Inventors: Jorge A. Heraud, Sunnyvale, CA (US); Arthur F. Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 364 days.

(21) Appl. No.: 12/079,339

(22) Filed: Mar. 25, 2008

(65) Prior Publication Data
US 2009/0243923 A1    Oct. 1, 2009

(51) Int. Cl.
*G01S 19/42* (2010.01)
*G01S 19/41* (2010.01)
*G01C 21/00* (2006.01)

(52) U.S. Cl. ............. 342/357.25; 342/357.24; 701/215

(58) Field of Classification Search ............ 342/357.03, 342/357.06, 357.07, 357.12, 359, 357.24, 342/357.25, 357.31; 701/213, 215
See application file for complete search history.

(56) References Cited

U.S. PATENT DOCUMENTS 5,764,511 A * 6/1998 Henderson .................... 700/66
6,880,643 B1 * 4/2005 Zimmerman et al. ......... 172/4.5
2009/0264094 A1 * 10/2009 Smith ...................... 455/404.2

* cited by examiner

*Primary Examiner*—Dao L Phan

(57) ABSTRACT

In a system for determining the positions of multiple towed vehicles that are towed by a towing vehicle, a satellite antenna is provided on each towed vehicle and a high accuracy satellite receiver is placed on the towing vehicle, the positions of the towed vehicle of interest being determined by switching its antennae signal through to the satellite receiver.

20 Claims, 2 Drawing Sheets

METHOD AND SYSTEM FOR MONITORING THE POSITIONS OF MULTIPLE TOWED VEHICLES USING A SINGLE HIGH ACCURACY RECEIVER

FIELD OF THE INVENTION

The invention relates to satellite based position determination. In particular it relates to the positioning information related to multiple towed vehicles.

BACKGROUND OF THE INVENTION

Global Positioning System (GPS) and the associated receivers are widely used in agricultural applications. One such application involves the leveling of agricultural land to reduce water accumulation or run-off caused by bumps and troughs in the land.

In order to map the undulations in the land a farm vehicle, e.g., a tractor or truck is typically driven back and forth across the field 100 as depicted by the line 102 in FIG. 1 to create a map in the xyz dimensions using a GPS receiver. For improved accuracy it is common to make use of the relative timing of signals transmitted from a number of satellites visible to the receiver and process the results using a technique referred to as Real Time Kinematics (RTK) to obtain highly accurate position fixes. For a better understanding of the concepts of GPS and RTK, a brief discussion is included below. One prior art technique involves using the resultant three dimensional map to produce a best-fit plain 200 as illustrated in FIG. 2.

In another prior art mapping approach, instead of using a satellite receiver to monitor the position of the vehicle, a laser plain is first created using laser beams, whereafter a vehicle is driven back and forth with a laser receiver to see if the height of the receiver and thus the height of the ground varies relative to the laser plain. This is discussed in U.S. Pat. No. 4,807,131 to Phil Clegg entitled Grading System. Once the mapping is complete, scrapers are pulled over the land to selectively scrape away the high sections and dump soil into the low sections to achieve a less undulating surface.

FIG. 3 shows a cross section through a typical prior art box scraper 300, which defines a bucket or housing 302 for receiving the soil, also referred to herein as dirt. In order not to limit the application to a particular type of scraper the term scraper and earth scraper will also be used herein. The scraping function is performed by a blade 304, controlled by pistons (not shown), which lower and raise the blade through an opening in the bottom of the housing 302. As the scraper 300 is pulled along with the blade 304 lowered, soil is scraped off the surface of the ground and passes over the top of the blade into the housing 302 where it accumulates. In order to dump this soil onto the ground at the desired locations a pusher 310 controlled by pistons 312 is activated to push the soil out of the front 314 of the housing 302 under the blade. Since the depth to which the blade can scrape is limited and also depends on the hardness of the ground, several passes may be necessary to remove and dump enough soil to level the piece of agricultural land or road that is being leveled. For instance, it is quite possible that one may have to scrape 5 feet deep, each scraping run removing only about 6 inches of soil from the surface and consequently requiring some 10 runs to remove the 5 feet of dirt. Typically a control algorithm is used to position the blade that governs when and how deep to scrape and when and how much soil to dump. Thus, it will be appreciated that the cost involved in leveling the bumps and troughs in the land is related to the amount of dirt that has to be moved since it corresponds to the time, fuel, and wear and tear on the machinery. Therefore any improvement in efficiency in performing the transfer of dirt from one location to another translates into a significant cost saving. While the above description refers to the leveling of agricultural land the process and system discussed in this application is not limited to agricultural land and could be used, for example, to level the ground for new road surfaces. Also the term leveling is used here to refer to the evening out of troughs and bumps to provide a smoother surface irrespective of what the angle of the resultant plain is. Thus it is not limited to flat plains but will quite commonly involve the forming of a smooth, less undulating slope.

In order to reduce the number of passes that has to be made by a scraper, one approach has been to connect two or more scrapers behind one another (also referred to as connection in series or in tandem) and switching from one scraper to the next when the first one is full. To achieve this the blade's height in each scraper is moved to control the depth to which it scrapes or the rate at which soil is dumped from the scraper.

Due to cost considerations, this solution is not without its issues, however as satellite receivers used for this purpose need to be highly accurate and are usually expensive.

The present invention seeks to address some of these issues by providing a new system and method of monitoring towed vehicle positions.

As mentioned above, some of the concepts of GPS, DGPS and RTK are laid out here for a better appreciation of the techniques and issues involved in obtaining positional information using a system of satellites.

In the available art, the Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55.degree. relative to the equator and being separated from each other by multiples of 60.degree. longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, and can be used to determine an observer's position anywhere on the Earth's surface, 24 hours per day. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHZ (nineteen centimeter carrier wavelength) and an L2 signal having a frequency $f2=1227.6$ MHZ (twenty-four centimeter carrier wavelength). These two frequencies are integral multiplies $f1=1,540\ f0$ and $f2=1,200\ f0$ of a base frequency $f0=1.023$ MHZ. The deployment of additional frequencies is being planned by the DOD.

The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information.

A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of f0=10.23 MHZ. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHZ. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all other satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8.degree. relative to the equator, and the three orbital planes are separated from each other by multiples of 120.degree. longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. Instead of making use of one set of carrier frequencies for all of its satellites and transmitting information on the carrier waves to identify the various satellites, as in the GPS system, the GLONASS system uses two carrier signals L1 and L2 with frequencies of f1=(1.602+9 k/16) GHz and f2=(1.246+7 k/16) GHz, where k(=1, 2, . . . 24) is the channel or satellite number. These frequencies lie in two bands at 1.597-1.617 GHz (L1) and 1,240-1,260 GHz (L2). The L1 code is modulated by a C/A-code (chip rate=0.511 MHZ) and by a P-code (chip rate=5.11 MHZ). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

The present application will also refer to a Satellite Based Augmentation System or SBAS, which will refer to a GPS or GLONASS, and to any other compatible satellite-based system that provides information by which an observer's position and the time of observation can be determined, all of which meet the requirements of the present invention.

From the above discussion it will be clear that a Satellite Based Augmentation System (SBAS) such as the Global Positioning System (GPS) or the Global Orbiting Navigation Satellite System (GLONASS), uses transmission of coded radio signals, with the structure described above, from a plurality of Earth-orbiting satellites. A SBAS antenna receives SBAS signals from a plurality (preferably four or more) of SBAS satellites and passes these signals to an SBAS signal receiver/processor, which (1) identifies the SBAS satellite source for each SBAS signal, (2) determines the time at which each identified SBAS signal arrives at the antenna, and (3) determines the present location of the SBAS satellites.

The range ($r_i$) between the location of the i-th SBAS satellite and the SBAS receiver is equal to the speed of light c times ($\Delta t_i$), wherein ($\Delta t_i$) is the time difference between the SBAS receiver's clock and the time indicated by the satellite when it transmitted the relevant phase. However, the SBAS receiver has an inexpensive quartz clock which is not synchronized with respect to the much more stable and precise atomic clocks carried on board the satellites. Consequently, the SBAS receiver estimates a pseudo-range ($pr_i$) (not a true range) to each satellite.

After the SBAS receiver determines the coordinates of the i-th SBAS satellite by demodulating the transmitted ephemeris parameters, the SBAS receiver can obtain the solution of the set of the simultaneous equations for its unknown coordinates ($x_0, y_0, z_0$) and for unknown time bias error (cb). The SBAS receiver can also determine velocity of a moving platform.

The discussion below refers specifically to GPS but is applicable to any satellite navigational system.

Differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. This improvement in the accuracy of the Global Positioning System (GPS) is possible because the largest GPS errors vary slowly with time and are strongly correlated over distance. DGPS also significantly improves the "integrity" of GPS for all classes of users, because it reduces the probability that a GPS user would suffer from an unacceptable position error attributable to an undetected system fault. Expected accuracies with DGPS are within the range from 1 to 5 meters.

Most DGPS systems use a single reference station to develop a scalar correction to the code-phase measurement. If the correction is delivered within 10 seconds, and the user is within 1000 km, the user accuracy should be between 1 and 10 meters.

Instead, a network of reference stations can be used to form a vector correction for each satellite. This vector consists of individual corrections for the satellite clock, three components of satellite positioning error (or ephemeris), and parameters of an ionospheric delay model. The validity of this correction still decreases with increased latency or age of the correction. However, compared to a scalar correction, a vector correction is valid over much greater geographical areas. This concept is called wide area DGPS, or WADGPS. Such network can be used for continental or even world-hemisphere coverage, because it requires many fewer reference stations than a collection of independent systems with one reference station each, and because it requires less communication capacity than the equivalent network of LADGPS systems.

Users with very stringent accuracy requirements may be able to use a technique called carrier-phase DGPS or CDPGS. For CDGPS, the definition of long baseline is arbitrary, but usually refers to baseline lengths exceeding 20 km and up to 100 km. Lines in excess of 100 km may be referred to as very long baselines.

These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy. The latter is also referred to as Real Time Kinematic or RTK.

The above discussion can be found in "Global Positioning System: Theory and Applications", Volume II, Chapter 1, by Bradford W. Parkinson and James J. Spilker Jr., published by the American Institute of Aeronautics and Astronautics, Inc. in 1996.

As mentioned above, the present invention deals specifically with the monitoring and adjusting of a scraper blade on a box scraper or other earth scraping implement.

SUMMARY OF THE INVENTION

According to the invention there is provided a system for monitoring the positions of two or more towed vehicles or of movable elements on two or more towed vehicles that are being pulled by a towing vehicle, comprising a satellite antenna mounted on each of the towed vehicles or movable elements, a GNSS receiver wherein signals from the satellite antennae mounted on the towed vehicles or movable elements are selectively coupled to the GNSS receiver system, and at least one switch for controlling the effective flow of said signals to the GNSS receiver. At least one switch may be controlled to permit the effective flow of signals to the GNSS receiver from only one satellite antenna on a towed vehicle at a time, wherein the at least one switch may serve to control at least one of power to the satellite antennae on the towed vehicles, and the communication channel between the satellite antennae on the towed vehicles and the GNSS receiver system.

The satellite receiver may be adapted to receive signals from one or more satellite systems such as GPS, Galileo, GLONASS, Beidou or Compass, and any Satellite Based Augmentation System (SBAS). The GNSS receiver preferably includes a satellite receiver adapted to receive one or more of GPS, Galileo, GLONASS, Beidou or Compass, and Satellite Based Augmentation System (SBAS) signals.

The GNSS receiver may include a processor for DGPS or RTK signal processing.

Each satellite antenna may include a signal amplifier, the at least one switch serving to control the amplifiers on the towed vehicles. Instead, the at least one switch may control power to the amplifiers so that the signal from only one of the satellite antennae on the towed vehicles is amplified at any one time. For purposes of this application the term amplifier includes any pre-amplifier. Thus control of or power to an amplifier includes control of or power to a pre-amplifier. Different voltage levels for the GNSS receiver amplifier may be used to serve as switch control signals. Two of the two or more different voltage levels may be used to define logic high and logic low signals for providing digital messages. Instead the at least one switch may be controlled using a control signal defined by the power supply voltage to the GNSS receiver amplifier that is pulse width modulated.

The towed vehicles may be towed scrapers such as drag scrapers, ejector scrapers, box scrapers or other types of scrapers used in agricultural or construction environment, and the moveable elements are at least one of a scraper blade and a pusher mounted on the towed scrapers.

Further, according to the invention there is provided a method of monitoring the positions of multiple towed vehicles that are being towed by a towing vehicle, comprising providing each towed vehicle with a satellite antenna system for receiving and amplifying satellite signals, providing the towing vehicle with a satellite receiver system that includes processing equipment to process satellite signals by DGPS or RTK, and receiving the amplified satellite signals at the towing vehicle from only one of the towed vehicles at any one time. The received satellite signals from the towed vehicle and from the satellite receiver on the towing vehicle may be processed using RTK.

DETAILED DESCRIPTION

The present invention proposes a new satellite-based position control system for the blades of a set of towed vehicles such as earth scrapers. In particular, in order to monitor the positions of multiple towed vehicles the present invention makes use of only a single high performance satellite receiver and a set of satellite antennae that the receiver is selectively connected to.

Figure 1:
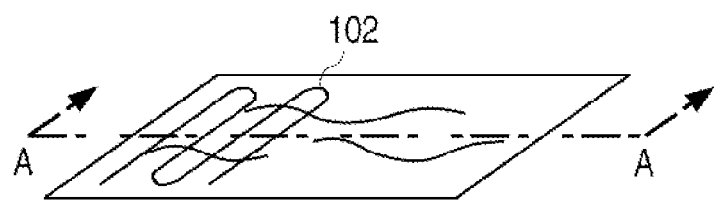
FIG. 1 is a three dimensional representation of an agricultural piece of land.
Figure 2:
FIG. 2 is a sectional view along the line A-A in FIG. 1.
Figure 3:
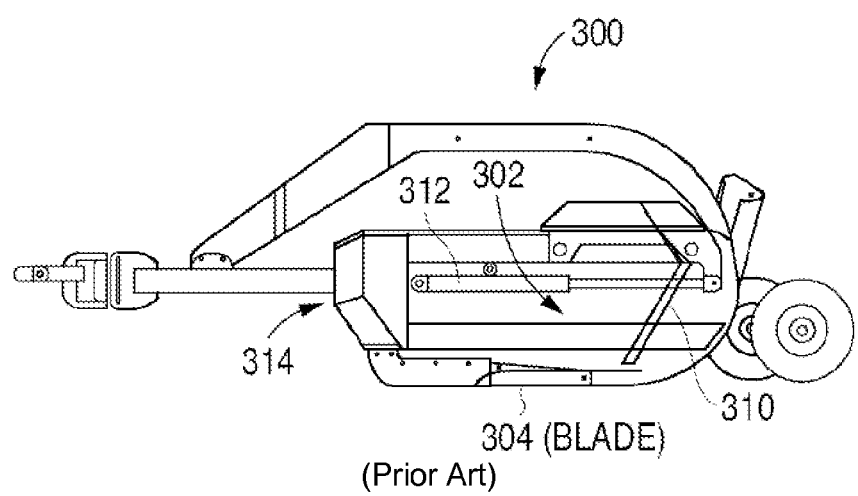
FIG. 3 is a sectional side view of a typical earth scraper as known in the art.
Figure 4:
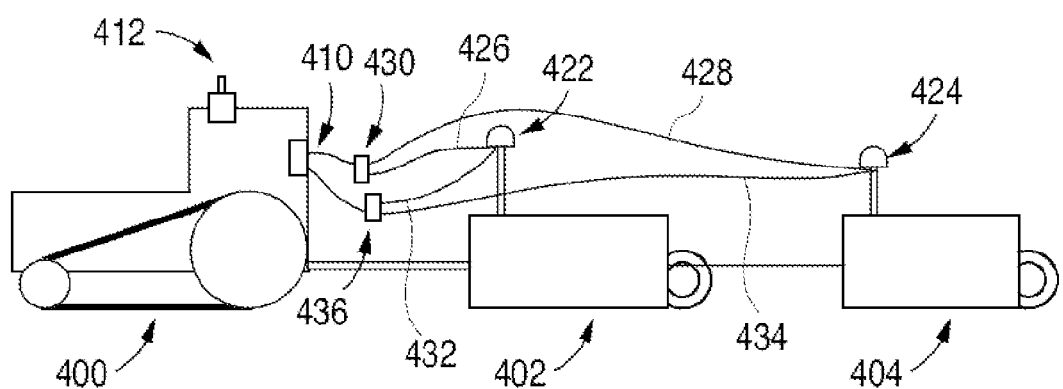
FIG. 4 is a simplified representation of a towing vehicle with two towed vehicles attached thereto in accordance with one embodiment of the invention.

One embodiment of the invention is shown in FIG. 4, which shows a towing vehicle 400 in the form of a tractor, pulling a set (in this case two) towed vehicles, which in this embodiment comprise two earth scrapers 402, 404. As shown in FIG. 4, the towing vehicle 400 is provided with a single satellite receiver 410 for the towed vehicles. The receiver 410 is typically mounted on the cabin of the tractor. The satellite receiver in FIG. 4 is a GPS receiver, however it could comprise any one or more Global Navigation Satellite System (GNSS) receivers including GPS, Galileo, GLONASS, Beidou, or any other Satellite Based Augmentation System (SBAS) receiver which currently includes WAAS, EGNOS and MSAS and is expected to include other Augmentation Systems from other countries in the future for receiving satellite signals from any one or more satellite systems.

For improved accuracy the satellite receiver 410 makes use of Real Time Kinematic (RTK) techniques.

The present embodiment of the invention, however, provides a technique for substantially limiting costs while still allowing the positions of the blades on two towed scrapers 402, 404 to be monitored and controlled to regulate which scraper is scraping and how deep the blade is scraping. In one embodiment the scraper blade positional information is also used to provide information about the location of the towed vehicle, thereby allowing the pusher to be controlled to control when and how quickly soil is to be ejected from the towed scraper.

Instead of making use of separate satellite receivers for each of the two towed vehicles, the present invention provides a satellite antenna 422, 424 on each of the scraper blades of the towed vehicles 402, 404 and makes use of a switch 430 to connect either the antenna 422 or the antenna 424 to the single GPS receiver 410. In the present embodiment the switch 430 makes use of the fact that the GPS antennae 422, 423 typically each include a signal amplifier. By controlling power from a central power source at the towing vehicle 400 to the signal amplifiers on the antennae 422, 424 using the switch 430, the signal strengths from the two antennae 422, 424 can be selectively adjusted to ensure that only one antenna signal is amplified at any one time. This allows both antennae 422, 424 to be combined by simply connecting signal lines 432, 434 through a power combiner 436. The combined signal thus allows the signal from the amplified antenna 422 or 424 to be monitored since the signal from the unamplified antenna is essentially eliminated.

Figure 5:
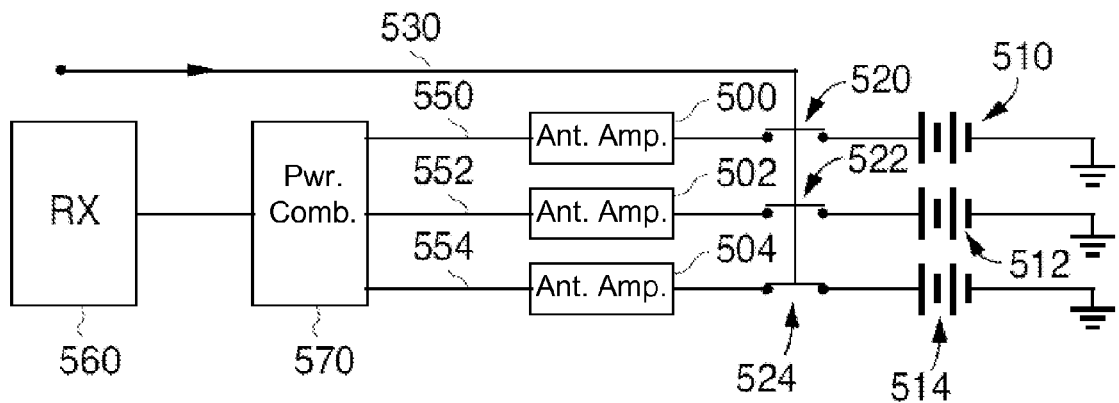
FIGS. 5-7 are schematic representations of three different embodiments for controlling the connection of the satellite antennae on the towed vehicles to the satellite receiver.

While the embodiment of FIG. 4 shows the power lines extending from a central power supply at the tractor 400, each of the antenna amplifiers could be provided with a local power supply, in which case a switch would be provided for each antenna power supply, the switch being controlled by logic from the tractor 400. Such an embodiment is shown in FIG. 5 which shows three satellite antenna amplifiers 500, 502, 504 connected to local power supplies 510, 512, 514 via switches 520, 522, 524, respectively. The switches 520, 522, 524 are controlled by means of a control line 530 from a microprocessor (not shown) mounted on the towing vehicle. The signal lines 550, 552, 554 from the amplifiers are connected to the satellite receiver 560 on the towing vehicle, via a power combiner 570.

Figure 6:
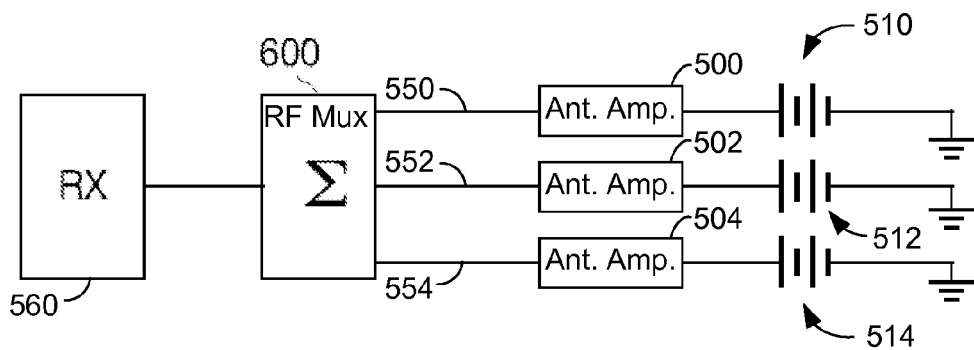

In another embodiment, shown schematically in FIG. 6, an RF switch in the form of a multiplexer 600 is included to pass through only one of the antenna signals at any one time.

Figure 7:
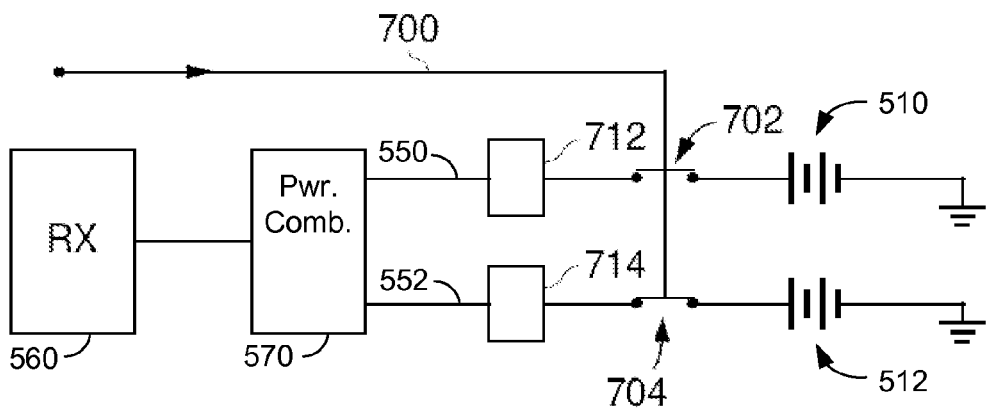

In yet another embodiment, shown in FIG. 7, a switch unit is used to control power to the satellite antennae on the towed vehicles. A control line 700 controls the switching unit 702 to selectively interrupt power to the antennae 712, 714.

In one embodiment of the invention, the control of the switching unit 702 is achieved by making use of the GPS receiver preamplifier power supply voltage. The preamplifier voltage of a GPS receiver is commonly sent on the center conductor of a coaxial cable to the GPS preamplifier that is in the GPS antenna housing. Since the preamplifier can typically use a range of voltages as its power supply, e.g. 5V to 12V, two different voltage levels could be used as a control signal to the switching unit to select between two different antennae. For instance antenna 1 can be switched to the GPS receiver when the antenna voltage from the receiver is set to 5 volts and antenna 2 is switched to when the antenna voltage is set to 7 volts. This has the benefit that when an antenna is not connected to a GPS receiver, power is not applied to the antenna, minimizing the need for crosstalk isolation in the GPS signal switch. In another embodiment, if more than two GPS antennae are to be used with a switching unit, the controlled output voltage of the GPS receiver (e.g. 5 and 7 volts) can be used to create a digital message in which the one voltage level defines logical low or 0, and the other voltage level defines logical high or 1. With an asynchronous messaging system, a start and stop bit is used, similar to that provided in the RS-252ASCII coding of digital characters. Alternatively, a different coding of 1's and 0's can be used with a RTZ (return to zero) code with a pulse width modulation to encode 0's and 1's.

It will therefore be appreciated that the present invention is not limited to any particular technique for controlling the connection of the satellite receiver on the towing vehicle to the various antennae on the towed vehicles and that the control of the switches or switching unit can be implemented in different ways.

Also, while the above discussion relates to the controlling of the blades and in some embodiments, the controlling of the pushers on towed scrapers such as drag scrapers, ejector scrapers, box scrapers or other types of scrapers used in agricultural or construction environment, the invention extends to the controlling of any moveable element on two or more towed vehicles to control the position of the moveable element or the towed vehicle. Thus, for example, the wheels or an axle of any two or more towed vehicles can be controlled by mounting the antennae on the towed vehicles to monitor and control the positions of the vehicles relative to each other and relative to the towing vehicle.

What is claimed is:

1. A system for monitoring the positions of two or more towed vehicles or of movable elements on two or more towed vehicles that are being pulled by a towing vehicle, comprising
a plurality of satellite antennae including a satellite antenna mounted on each of the two or more towed vehicles or on movable elements of each of the two or more towed vehicles,
a GNSS receiver wherein signals from the satellite antennae mounted on the towed vehicles or movable elements are selectively coupled to the GNSS receiver system, and
at least one switch configured for controlling the flow of said signals to the GNSS receiver.

2. A system of claim 1, wherein the satellite receiver is adapted to receive signals from one or more satellite systems.

3. A system of claim 2, wherein the satellite systems include GPS, Galileo, GLONASS, Beidou or Compass, and any Satellite Based Augmentation System (SBAS).

4. A system of claim 1, wherein the GNSS receiver includes a satellite receiver adapted to receive at least one of GPS, Galileo, GLONASS, Beidou or Compass, and Satellite Based Augmentation System (SBAS) signals.

5. A system of claim 4, wherein the GNSS receiver includes a processor for DGPS or RTK signal processing.

6. A system of claim 1, wherein the at least one switch is controlled to permit the effective flow of signals to the GNSS receiver from only one satellite antenna on a towed vehicle at a time.

7. A system of claim 6, wherein the at least one switch serves to control at least one of power to the satellite antennae on the towed vehicles, and the communication channel between the satellite antennae on the towed vehicles and the GNSS receiver system.

8. A system of claim 1, wherein each satellite antenna includes a signal amplifier, the at least one switch serving to control the amplifiers on the towed vehicles.

9. A system of claim 8, wherein the at least one switch controls power to the amplifiers so that the signal from only one of the satellite antennae on the towed vehicles is amplified at any one time.

10. A system of claim 7, wherein the at least one switch is controlled using two or more different voltage levels for the GNSS receiver amplifier to serve as switch control signals.

11. A system of claim 10, wherein the two of the two or more different voltage levels are used to define logic high and logic low signals for providing digital messages.

12. A system of claim 7, wherein the at least one switch is controlled using a control signal defined by the power supply voltage to the GNSS receiver amplifier that is pulse width modulated.

13. A system of claim 9, wherein the at least one switch is controlled using two or more different voltage levels for the GNSS receiver amplifier to serve as switch control signals.

14. A system of claim 13, wherein the two of the two or more different voltage levels are used to define logic high and logic low signals for providing digital messages.

15. A system of claim 9, wherein the at least one switch is controlled using a control signal defined by the power supply voltage to the GNSS receiver amplifier that is pulse width modulated.

16. A system of claim 1, wherein the towed vehicles are towed scrapers used in agricultural or construction environments.

17. A method of monitoring the positions of multiple towed vehicles that are being towed by a towing vehicle, comprising
providing each towed vehicle with a satellite antenna system for receiving and amplifying satellite signals,
providing the towing vehicle with a satellite receiver system that includes processing equipment to process satellite signals by DGPS or RTK, and
receiving the amplified satellite signals at the towing vehicle from only one of the towed vehicles at any one time.

18. A method of claim 17, wherein the received satellite signals from the towed vehicle and from the satellite receiver on the towing vehicle are processed using RTK.

19. A system of claim 1, wherein the towed vehicles are towed scrapers selected from the group consisting of drag scrapers, ejector scrapers, and box scrapers.

20. A system of claim 19, wherein the moveable elements are at least one of a scraper blade and a pusher mounted on the towed scrapers.

* * * * *